United States Patent [19]

Diels et al.

[11] 4,096,678
[45] Jun. 27, 1978

[54] INSULATED CONSTRUCTION ELEMENT

[75] Inventors: Manfred Diels; Karl Wilhelm Dienstuhl, both of Meinerzhagen; Tilo Jäger; Eitel Höcker, both of Bielefeld, all of Germany

[73] Assignees: Otto Fuchs KG., Meinerzhagen; Schüco Heinz Schürmann GmbH & Co, Bielefeld, both of Germany

[21] Appl. No.: 744,177

[22] Filed: Nov. 22, 1976

[30] Foreign Application Priority Data

Nov. 25, 1975 Germany .............................. 2552700

[51] Int. Cl.² .............................................. E04B 1/62
[52] U.S. Cl. ........................................ 52/403; 52/731; 49/DIG. 1; 29/416
[58] Field of Search ............. 49/DIG. 1; 52/403, 731; 29/509, 515, 155 R, 514, 731

[56] References Cited

U.S. PATENT DOCUMENTS

| 3,093,217 | 6/1963 | Doede | 49/DIG. 1 |
|---|---|---|---|
| 3,125,192 | 3/1964 | Ramseur | 29/509 |
| 3,420,026 | 1/1969 | Nolan | 49/DIG. 1 |
| 3,441,995 | 5/1969 | Revell | 29/155 R |
| 3,445,974 | 5/1969 | Bragman | 4/DIG. 1 |
| 3,517,472 | 6/1970 | Toth | 52/403 |
| 3,765,136 | 10/1973 | Mudd | 52/180 |
| 3,992,769 | 11/1976 | Jackson | 52/403 |
| 3,999,354 | 12/1976 | Anter | 29/509 |

FOREIGN PATENT DOCUMENTS

| 1,454,762 | 8/1966 | France | 49/DIG. 1 |
|---|---|---|---|
| 182,672 | 2/1963 | Sweden | 52/403 |

Primary Examiner—John E. Murtagh
Attorney, Agent, or Firm—Michael J. Striker

[57] ABSTRACT

Two elongated metallic profiles each formed with two pairs of flanges each of which forms a longitudinally extending groove are positioned with the two grooves of each profile parallel and opening toward the two grooves of another such profile. An elongated bar of insulating material having a pair of longitudinally extending sides is fitted between each groove of each profile and the corresponding groove of the other profile. This forms a longitudinally extending passage defined on two opposite sides by the two insulating bars and on the other two sides by the two profiles. A tool is disposed through this passage so as plastically and permanently to deform the inner flanges outwardly and into intimate tight contact with the bars.

13 Claims, 25 Drawing Figures

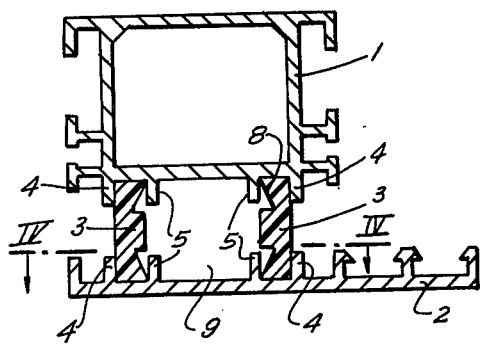
FIG. 1
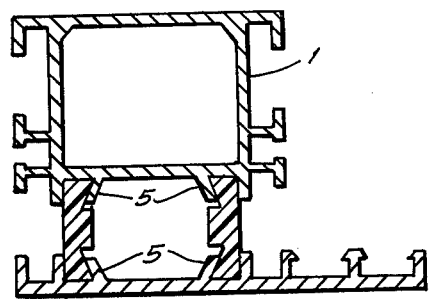
FIG. 2
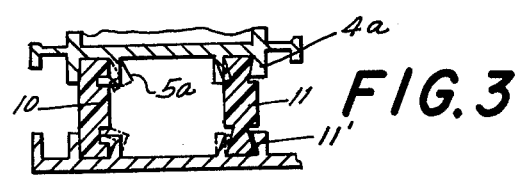
FIG. 3
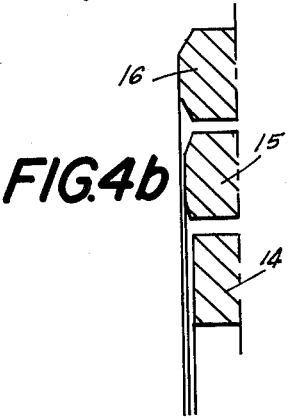
FIG. 4c
FIG. 4b
FIG. 4a
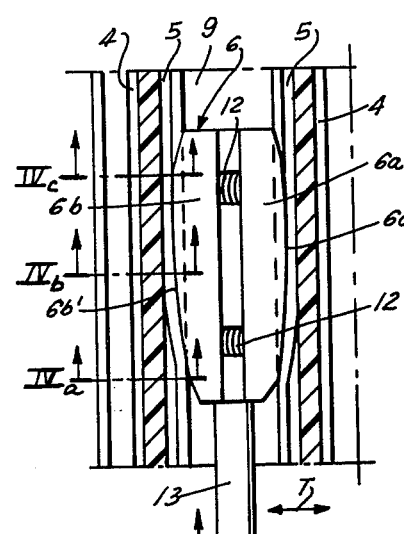
FIG. 4
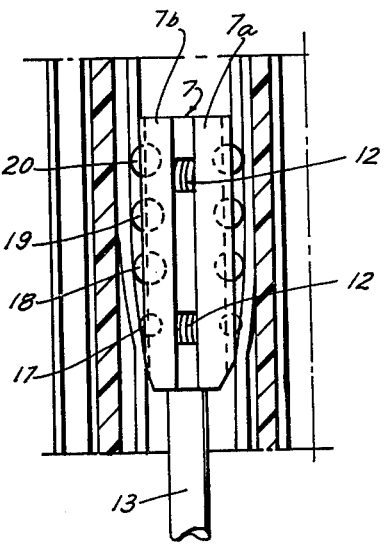
FIG. 5

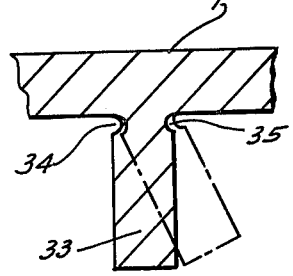
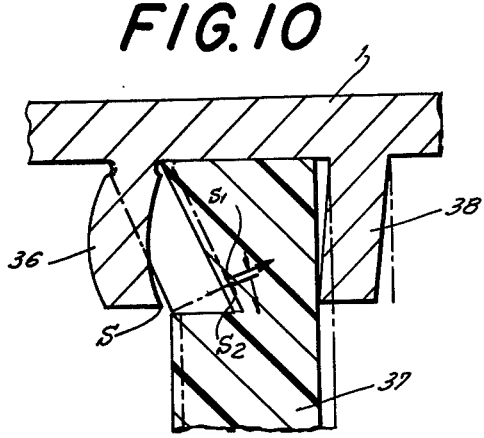
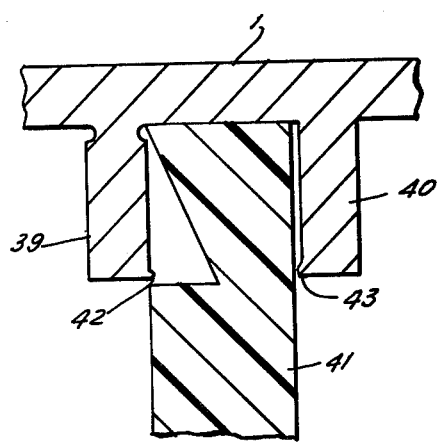
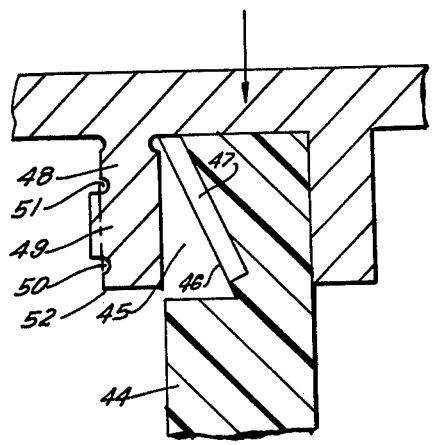
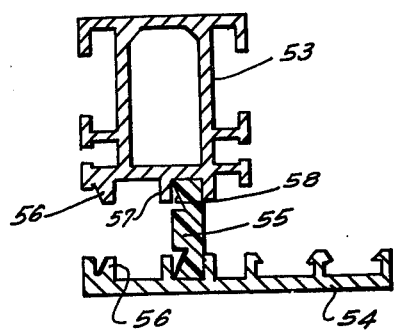
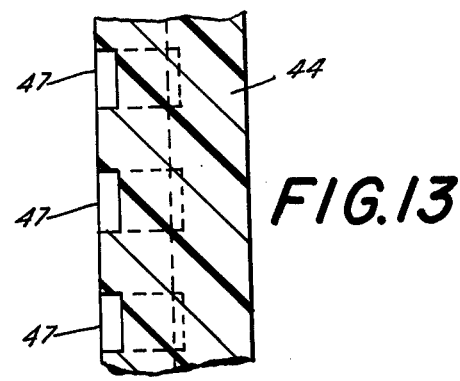

FIG. 20
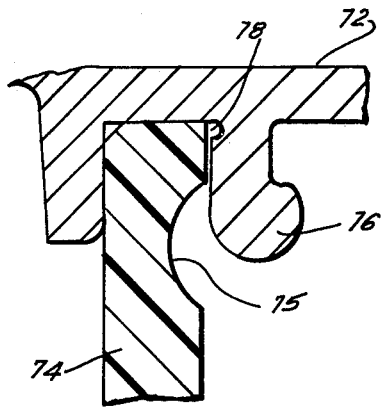
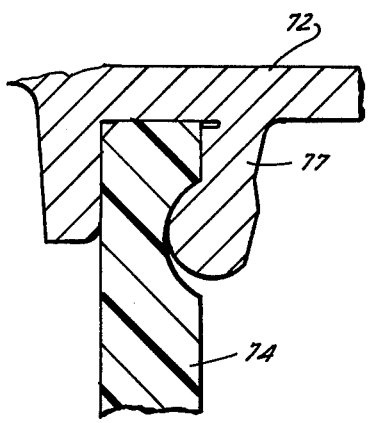
FIG. 21

INSULATED CONSTRUCTION ELEMENT

BACKGROUND OF THE INVENTION

The present invention relates to a construction element, a method of making a construction element and a tool for making a construction element. More particularly this invention concerns such a construction element formed by a pair of metallic profiles extending longitudinally parallel to each other and joined by a longitudinally extending bar of insulating material.

A construction element is known comprising a pair of metallic profiles extending longitudinally parallel to each other and joined together by means of a longitudinally extending bar of insulating material. Thus, for instance, each of the profiles is formed on its side turned toward the other profile with a pair of groove-defining flanges. One edge or side of the insulating bar is held in the groove of one of the profiles and the other side or edge of the insulating bar is held in the groove defined by the flanges of the other profile. In this manner the two metallic profiles, by which is meant elongated unitary metallic elements of profiled cross-sectional shape, are joined together without touching each other so that the two are relatively insulated with respect to heat and electricity. Nonetheless, the construction element formed by such a three-part assembly is quite rigid. It is known to use this type of construction element as a door or window molding between locations of different temperatures so that minimum heat transfer takes place. Such an arrangement is also used in refrigeration devices and the like.

Typically the flanges forming the grooves that receive the sides of the insulating bar are inclined slightly toward each other and the sides of the insulating bar are given a dovetail cross-sectional shape. In order to assemble such a construction element the edges of the insulating bar are merely slipped longitudinally into the correspondingly trapezoidal-shaped grooves in the profiles.

The considerable disadvantage of this type of construction element is that when assembled the various parts, although transversely locked securely together, can often slip longitudinally relative to each other. Furthermore the parts often fit somewhat loosely so that the construction element is not usable for a watertight joint. What is more the assembly of such an arrangement is frequently bothersome, in particular when a particularly long construction element must be employed, as the longitudinal slipping-together of the various parts requires considerable floor space and precision.

SUMMARY OF THE INVENTION

It is therefore an object of the present invention to provide an improved construction element of the above-described general type as well as an improved method of and tool for making such an element.

These objects are attained according to the present invention in a construction element of the above-described general type wherein at least one of the flanges of each of the pairs of flanges forming the grooves receiving the sides of the insulating bar is permanently plastically deformed into a corresponding recess of the insulating bar. Moreover means is provided on at least this one flange of each pair of longitudinally locking the insulating bar relative to the profiles and preventing relative longitudinal displacement of the bar and the profile.

Thus in accordance with the present invention the construction element is made by positioning two elongated metallic profiles each formed with a pair of flanges forming a longitudinally extending groove so that the grooves are parallel to each other and open toward each other. An elongated bar of insulating material having a pair of longitudinally extending sides is fitted between the profiles that are thus positioned with each of the sides of the bar received in a respective groove. Thereafter one of the flanges of each of the pairs of flanges is plastically and permanently deformed into tight contact with the bar.

Thus it is possible to make the construction element according to this invention relatively easily, and to obtain an element which is usable in situations where a gastight or watertight seal is needed, and wherein longitudinal stability of the various parts relative to each other is essential. Furthermore it is possible once such an element has been made to paint it, anodize it or even heat treat it without loosening the connection between the various parts. When such an arrangement is made, for instance, of aluminum profiles connected by a fiberglass-reinforced polyamide bar, it is possible to form a construction element of extremely good strength and insulating properties at relatively low cost.

In accordance with another feature of this invention each of the profiles is formed with two pairs of such flanges each forming a respective groove, and a pair of such insulating bars joined together with the two profiles to make a four-part construction element. Such an arrangement greatly increases the transverse dimensional stability of the element. Furthermore it is possible readily to form such an element by setting the various parts in the desired position, then drawing a tool through the passage formed on two opposite sides by the bars and on the other two opposite sides by the profiles. This tool has a pair of side parts each having a respective face in contact with two flanges bearing on one of the insulating bars and means for urging the two faces apart. Furthermore means is provided such as a rod for drawing this tool longitudinally along the above-described passage so as to bend the four inner flanges outwardly into tight contact with the respective bars, thereby forming a very stable assembly in one simple step. Springs may be provided between the side parts of this tool and rollers may be provided on its outer surfaces in order to facilitate its sliding along the inside of the passage through the construction element. It is also within the scope of this invention to provide on each of the faces of the tool a toothed wheel whose teeth engage the flanges and form in them a series of ridges corresponding to underlying depressions formed in the bar, so that the longitudinal stability of the assembly is greatly increased by the interaction of these pushed-in formations and the depressions.

It is within the scope of this invention to provide a region of reduced cross-sectional size adjacent the base of the one flange that is plastically deformed. This may be formed as a longitudinally extending groove. It is also possible to form the flange with a rectangular section, a section tapered away from the respective profile, a curved sectional shape, or even an L-shaped section. When a curved flange is used the tool flattens out the curve as it depresses it into the insulating bar. The L-shaped flange is plastically pushed into an L-section longitudinally extending recess in the side of the insulating bar. The flange may also be formed with one or more ridges on its face turned toward the respective insulating bar so that when it is pressed thereagainst this ridge is imbedded in the bar and makes a watertight contact therewith. Furthermore a welt may be formed on the flange to be deflected so as to form a supply of material that is plastically deformed into the recess of the bar.

It is also within the scope of this invention to deform the two flanges forming each groove during assembly of the construction element. As the one flange is being pressed as described above against the insulating bar the insulating bar will press against the other flange which may simultaneously be pressed somewhat outwardly but in such a manner that it remains in very tight contact with the respective side edge of the insulating bar. Thus the groove adapted to receive the side of the insulating bar may originally be of parallelogrammatic section, being transformed after the deflection into right-triangular section, with all three planar surfaces defining the groove lying in tight planar contact with the respective surfaces of the side of the bar.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1 and 2 are cross-sections through an embodiment of the construction element according to this invention during and after assembly, respectively;

FIG. 3 is a view corresponding to FIG. 2 illustrating a second embodiment of the construction element in accordance with this invention;

FIG. 4 is a longitudinal section showing making of the assembly of FIGS. 1 and 2;

FIGS. 4a, 4b and 4c are sections taken along lines IVa, IVb and IVc of FIG. 4;

FIG. 5 is a view similar to FIG. 4 illustrating a second embodiment of the tool according to this invention;

FIG. 9 is a large-scale sectional view of a detail of a fifth embodiment of the construction element in accordance with this invention;

FIGS. 10, 11 and 12 are sectional views through the grooves and insulating bars of sixth, seventh and eighth embodiments of the construction element according to this invention;

FIG. 13 is a view taken in the direction of arrow XIII of FIG. 12 on the insulating bar thereof;

FIG. 14 is a cross-sectional view through a ninth embodiment of the construction element according to this invention;

FIGS. 20 and 21 are large-scale detail views of FIGS. 18 and 19, respectively.

DESCRIPTION OF THE PREFERRED EMBODIMENTS

Figure 6:
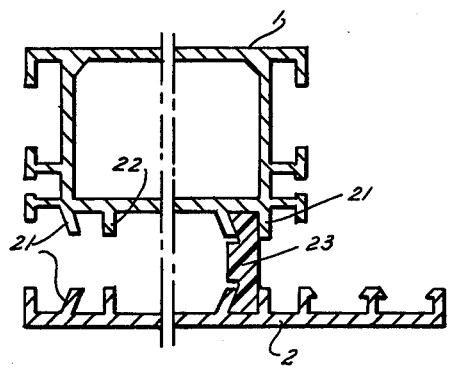
FIG. 6 is a view similar to FIG. 2 showing a third embodiment of the construction element according to this invention.

The arrangement shown in FIGS. 1 and 2 has a pair of aluminum profiles 1 and 2 joined together by a pair of synthetic-resin profiled insulating bars 3. Each of the profiles 1 and 2 is formed with two outer flanges 4 and two inner flanges 5, each pair of flanges 4 and 5 forming a respective groove receiving a respective longitudinal side of a respective one of the bars 3.

The inner flanges 5 can be deflected outwardly by means of tools 6 or 7 as shown in FIGS. 4 and 5 respectively to fit into triangular-section recesses 8 extending longitudinally the full length of the bars 3. The tool 6 or 7 is drawn longitudinally through the passage 9 formed between the two profiles 1 and 2 and the two bars 3 so as to deflect the inner flanges 5 from their position shown in FIG. 1 extending perpendicularly to the respective profile to their position shown in FIG. 2 extending at an angle thereto and lying tightly against the corresponding face of the respective bar 3 at the respective recess 8.

It is also possible as shown in FIG. 3 to use an insulating bar 10 having a laterally open square-section groove in which engages an L-section inner flange 5a. FIG. 3 also shows how a bar 11 may be used having dovetail-section sides engageable with respective inwardly inclined outer flanges 4a.

The tool 6 shown in FIG. 4 has a pair of parts 6a and 6b displaceable in a transverse direction T relative to the longitudinal axis L defined by the profiles 1 and 2 and by the bars 3. These two side parts 6a and 6b are mounted on a rod 13 that allows them to be pulled or pushed in direction L through the passage 9. Springs 12 between these two parts 6a and 6b push the faces 6a' and 6b' thereof against the inner flanges 5 so as to move them from the position shown in FIG. 1 to the position shown in FIG. 2. The face 6b' like the face 6a' is flat as shown at 14 in FIG. 4a at the leading end of the tool 6, then projects somewhat as shown at 15 in FIG. 4b, then somewhat more as shown at 16 in FIG. 4c. Thus as the tool is moved downwardly as shown in FIG. 4 the surface 6b', like the surface 6a', will smoothly deflect the flanges 5 to the side.

FIG. 5 shows another tool 7 having, like the tool 6, a pair of side parts 7a and 7b urged apart by relatively strong compression springs 12. Each of these parts 7a and 7b is provided with a row of four rollers 17–20. The roller 17 is considerably smaller in diameter than the roller 20 and the rollers 18 and 19 may either be the same size as the roller 20 or of graduated sizes between the size of the rollers 17 and 20. Once again this tool may be pulled along the passage 9 by means of a rod 13, although it is fully within the scope of this invention to push it along by means of the rod 13.

It is possible to form the two parts of the tool as a single unitary piece, similar in shape to a tuning fork. In such an arrangement the inherent springiness of the material constituting the tool would serve as the spring means for urging the two parts apart and into contact with the flanges 5 so as to press them into engagement with the bars 3.

It is possible as shown in FIG. 6 to form the two profiles 1 and 2 with outer flanks 21 that extend at an angle to the respective profiles and inner flanks 22 that extend perpendicular thereto. In such an arrangement a tool is drawn through the passage between the two profiles 1 and 2 so as to deflect the inner flanges 22 outwardly and to deflect the outer flanges 21 into a perpendicular position by pushing through the bar 23. Such an arrangement assures very good contact with both faces of the bar 23. In all the above-described arrangements at least the flanges 4 are provided with a coating in which particles are imbedded so as to increase the local coefficient of friction.

Figures 7, 7A:
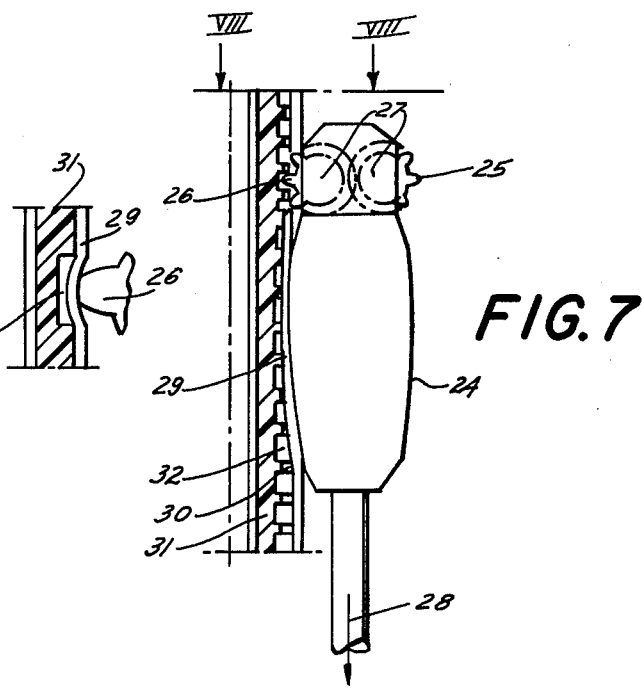
FIG. 7 is a longitudinal section through a portion of a fourth embodiment of the construction element according to this invention in conjunction with a third tool according to this invention.
FIG. 7a is a large-scale top view of a detail of FIG. 7.
Figure 8:
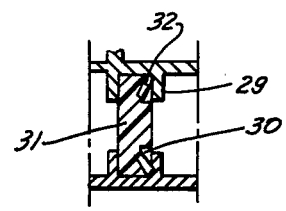
FIG. 8 is a section taken along line VIII-VIII of FIG. 7.

The arrangement of FIGS. 7, 7a and 7b has a tool 24 provided with a pair of toothed wheels 25 and 26 rotatable about parallel axes 27 and meshing with each other at the back end of the tool 24. A rod 28 is used to pull this tool 24 which is otherwise formed substantially identically to the tool of FIG. 4 through the passage as described above.

In this arrangement the teeth of the wheels 25 and 26 as shown in FIG. 7a serve to deflect inner flanks 29 into recesses 30 identical to the recesses 8, and further to deflect portions of these flanges 29 into a further row of depressions 32 formed in the bar 31. Thus each of the flanges 26 is not only pressed into tight contact with the bar 31, but is formed with a longitudinal row of bumps each engaged in a respective one of the depressions 32 as shown in FIG. 7a. Such an arrangement gives extremely good longitudinal stability to the assembly.

In FIG. 9 an element 1 is shown having an inner flange 33 of rectangular section but formed adjacent its base with a pair of longitudinally-extending grooves 34 and 35. These formations 34 and 35 insure that when bent to the side as shown in dot-dash lines in FIG. 9 the flange 33 will bend only at its base, not deforming the element 1.

FIG. 10 shows another arrangement wherein a pair of flanges 36 and 38 serve to form a groove in which is received the edge of an insulating bar 37. The flange 36 has an inner point S and is formed with grooves like the grooves 34 and 35 of FIG. 9. In addition this flange 36 is part-cylindrical and concave toward the bar 37. When deflected inwardly the point S will move by deformation of the flange 36 from a point $S_1$ to a point $S_2$, thereby insuring a very good bite into the bar 37.

The flange 38 in the arrangement of FIG. 10 is rectangular in section but is tipped slightly toward the flange 38 so that when the flange 36 is bent inwardly the bar 37 presses against the flange 38 and moves it into the dot-dash line position perpendicular to the respective element 1. Once again extremely good contact between the flanges 36 and 38 and the bar 37 is insured, giving a watertight fit.

FIG. 11 shows an arrangement wherein each of a pair of flanges 39 and 40 which normally extending perpendicular to the respective element 1 are formed on their confronting faces with small ridges 42 and 43 that are imbedded in the bar 41 when the element 39 is bent over against this bar 41. These ridges 42 and 43 are formed at the points furthest away from the profile 1 and insure that even a capillary leakage between the flanges 39 and 40 and the bar 41 cannot occur.

The arrangement of FIGS. 12 and 13 employs a bar 44 having a recess 45 below whose inner face 46 is formed a multiplicity of depressions 47. The corresponding flange 48 is formed on its face turned away from the bar 44 with a longitudinally extending ridge 49 flanked by a pair of grooves 50 and 51. When the flange 48 is bent against the surface 45 sufficient pressure is applied to deform the bump 49 and flatten it out as shown in dot-dash lines. This action simultaneously causes bumps to form on the opposite face of the flange 48 in the region of the depressions 47 so that once again a series of bumps on the flange 48 will longitudinally link the elements 48 and 44 tightly together. In this arrangement it is noted that the ridge 49 could be formed all the way up on the corner 52 of the flange 48.

In the arrangement of FIG. 14 a pair of profiles 53 and 54 are interconnected by a single insulating bar 55 having a pair of recesses 58. The passage of this assembly is formed between a pair of flanges 57 engageable in the recesses 58 and flanges 56 spaced transversely therefrom. These flanges 56 are substantially thicker in cross-sectional size than the flanges 57 so that when pressure is exerted between them the flanges 57 will be bent over into the recesses 58 and the flanges 56 will not be bent at all.

Figure 15:
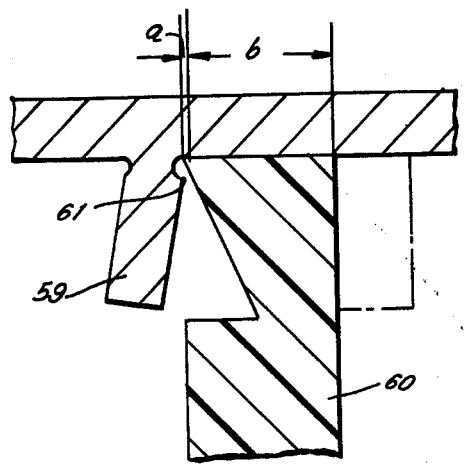
FIGS. 15, 16 and 17 are large-scale sectional views through details of tenth, eleventh and twelfth embodiments of the arrangement in accordance with this invention.

In the arrangement of FIG. 15 a flange 59 is employed which is cut away at its base as shown in FIG. 9 and has a point 61 adjacent its base and turned toward the respective bar 60. This flange 59 is generally of rectangular section and is tipped away from the bar 60 so that it defines with the corresponding other flange a gap having a width equal to the thickness $b$ of the bar 60 plus a short distance $a$. Thus this distance is somewhat greater than the thickness of the bar 60, making fitting it in place relatively easy. At the same time once the flange 59 is bent over it closes the gap $a$ and forms a tight connection with the corresponding face of the bar 60. It is noted that when this is done the edge 61 will bite into the normally synthetic-resin bar 60 so as to form a fluid-tight contact therewith.

Figure 16:
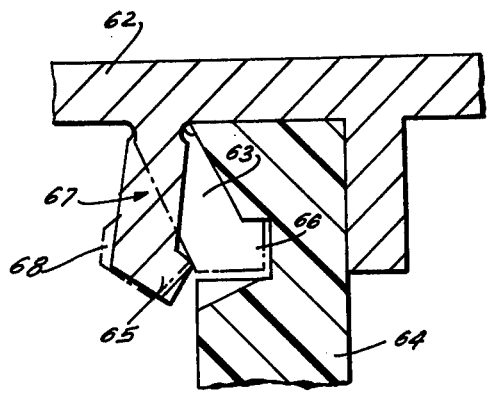

In FIG. 16 the assembly uses an element 62 having a flange 67 engageable in a recess 63 formed in a bar 64. The recess 63 here is also formed with a lateral extension 66 and the flange 67 with a corresponding tooth or ridge 65, giving it an L-section. Thus when the flange 67 is bent in from the position similar to the position shown in FIG. 15 to the dot-dash position a very good contact is insured between the flange 67 and bar 64. It is noted that the formation 65 may be a series of teeth. At the same time small formations or welts 68 may be provided on the opposite side of the flange 67 to provide a mass of material which can be plastically deformed into the recess 63 when the flange 67 is bent over.

Figure 17:
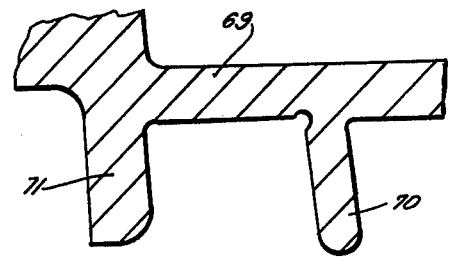

FIG. 17 shows how a profile 69 can have a relatively thin flange 70 coacting with a relatively thick flange 71, both inclined somewhat in the same direction so as to form a parallelogrammatic groove for the respective edge of the respective bar. Here once the flange 70 is bent over force transmission through the bar will bend the flange 71 into a perpendicular position.

Figure 18:
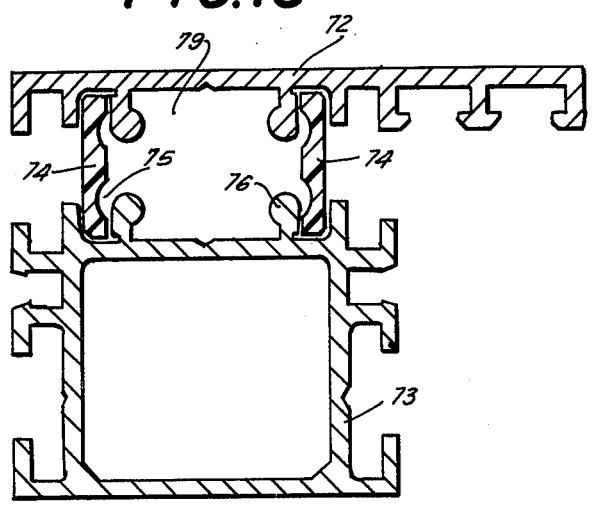
FIGS. 18 and 19 are sectional views through a thirteenth embodiment of the construction element in accordance with this invention during and after assembly thereof.
Figure 19:
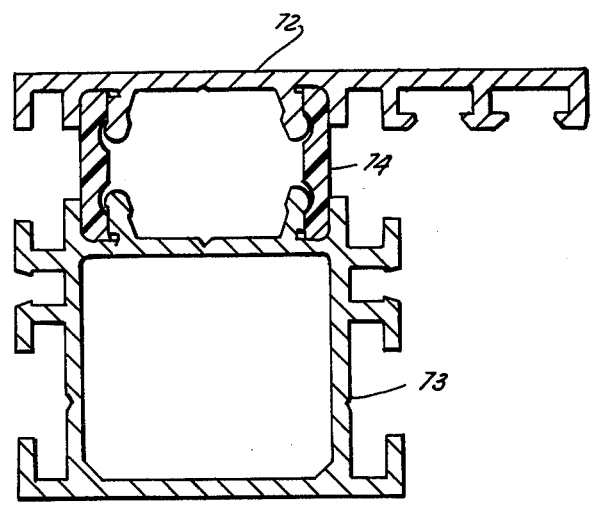

Finally the arrangement shown in FIGS. 18-20 has a pair of profiles 72 and 73 interconnected by a pair of identical insulating bars 74 of nylon. The inner flanges 77 of these elements 72 and 73 are formed on their outer surfaces with welts 76 and their bases with small grooves 78. When bent over the material forming these welts 76 is displaced into longitudinally extending grooves 75 formed in the elements 74 so as integrally to unite the elements together. FIGS. 18 and 20 show the arrangement before a tool is drawn through the passage 79 between the inner flanges 77 and FIGS. 19 and 21 show the arrangement after a tool is drawn through them and the flanges 77 are bent over with the welts 76 displaced into the recesses 75.

With the system according to the present invention it is therefore possible to form an integrally connected construction assembly which has extremely good longitudinal stability. Such arrangements may readily be used for door or window moldings, or in refrigeration devices where it is necessary to provide rigid metallic connecting elements which nonetheless are not electrically or thermally connected together.

It will be understood that each of the elements described above, or two or more together, may also find a useful application in other types of methods and assemblies differing from the types described above.

While the invention has been illustrated and described as embodied in an insulated construction element, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A construction element comprising:
   an elongated bar having a pair of longitudinally extending sides and formed along each of said sides with a longitudinally extending recess having a laterally directed face;
   a pair of elongated metallic profiles each formed with a pair of flanges forming a respective groove receiving a respective side of said bar, at least one of said flanges of each of said pairs being plastically deformed into the respective recess and having a face bearing on the face of the respective recess;
   a coating on at least one of said faces; and
   particles imbedded in and projecting from said coating, whereby the coefficient of friction between said bar and said profiles is greatly increased at said recesses.

2. The construction element defined in claim 1, wherein said recesses each extend longitudinally the full length of said bar along the respective side and are shaped so that said bar is thicker outside said recesses than at said recesses.

3. The construction element defined in claim 2, wherein said one flanges are formed with a region of reduced thickness.

4. The construction element defined in claim 3, wherein each of said regions is formed with a longitudinally extending groove.

5. The construction element defined in claim 2, wherein each of said one flanges is generally rectangular in section.

6. The construction element defined in claim 2, wherein each of said one flanges tapers transversely of the elongation of the respective profile.

7. The construction element defined in claim 2, wherein each of said one flanges is of L-section.

8. The construction element defined in claim 2, wherein each of said one flanges has a face turned toward the other flange of the respective pair and formed with a lip extending toward the respective other flange and imbedded in the respective side of said bar.

9. The construction element defined in claim 2, wherein each of said one flanges is formed with a plastified welt.

10. The construction element defined in claim 2, wherein the other flange of each of said pairs is substantially stronger than the respective one flange.

11. The construction element defined in claim 2; further comprising a second such bar spaced from and parallel to the first-mentioned bar, each of said profiles being provided adjacent the first-mentioned pair of flanges with a second pair of flanges forming a second groove parallel to the first-mentioned groove and receiving the sides of the second bar in the same manner as the first flanges receive the sides of the first bar.

12. The construction element defined in claim 11, wherein said one flange of each of said pairs is that flange closer to the other pair of flanges of the respective profile, said one flanges being deflected outwardly away from each other and being received in the respective recesses.

13. The construction element defined in claim 12, wherein the other flanges of said pairs are substantially greater in cross-sectional size and stronger than said one flanges.

* * * * *